United States Patent
Neckel

(10) Patent No.: US 11,373,452 B2
(45) Date of Patent: Jun. 28, 2022

(54) MULTIDIMENSIONAL ANALYSIS OF GAIT IN RODENT

(71) Applicant: Georgetown University, Washington, DC (US)

(72) Inventor: Nathan Neckel, Arlington, VA (US)

(73) Assignee: Georgetown University, Washington, DC (US)

( * ) Notice: Subject to any disclaimer, the term of this patent is extended or adjusted under 35 U.S.C. 154(b) by 162 days.

(21) Appl. No.: 16/534,010

(22) Filed: Aug. 7, 2019

(65) Prior Publication Data
US 2020/0050840 A1    Feb. 13, 2020

Related U.S. Application Data

(60) Provisional application No. 62/715,435, filed on Aug. 7, 2018.

(51) Int. Cl.
*G06V 40/20* (2022.01)
*G06V 20/64* (2022.01)

(52) U.S. Cl.
CPC ............ *G06V 40/25* (2022.01); *G06V 20/653* (2022.01)

(58) Field of Classification Search
CPC ............ G06K 9/00348; G06K 9/00214; A61B 5/112; A61B 5/1121; A61B 5/1123; A61B 5/1124; G06V 40/25; G06V 20/653
See application file for complete search history.

(56) References Cited

U.S. PATENT DOCUMENTS

| | | | | |
|---|---|---|---|---|
| 4,631,676 A | * | 12/1986 | Pugh | A61B 5/1038 348/77 |
| 11,158,422 B1 | * | 10/2021 | Wilson | G16H 40/63 |
| 2010/0030482 A1 | * | 2/2010 | Li | G06K 9/00342 702/19 |
| 2012/0253234 A1 | * | 10/2012 | Yang | A61B 5/1038 600/595 |
| 2014/0303524 A1 | * | 10/2014 | Chen | A61B 5/11 600/595 |

(Continued)

OTHER PUBLICATIONS

Nathan D. Neckel, Methods to quantify the velocity dependence of common gait measurements from automated rodent gait analysis devices, Journal of Neuroscience Methods, vol. 253, 2015, pp. 244-253, ISSN 0165-0270, https://doi.org/10.1016/j.jneumeth.2015.06.017. (Year: 2015).*

(Continued)

*Primary Examiner* — Michael Robert Cammarata
(74) *Attorney, Agent, or Firm* — Smith Gambrell & Russell LLP

(57) ABSTRACT

Embodiments of the present systems and methods may provide techniques for analyzing rodent gait that addresses the confound of interdependency of gait variables to provide more accurate and reproducible results. In embodiments, multidimensional analysis of gait in animals, such as rodents, may be performed. For example, in an embodiment, a computer-implemented method of animal gait analysis may comprise capturing data relating to steps taken a plurality of animal test subjects, performing a multidimensional analysis of the captured data to generate data describing a gait of the animal test subjects, and outputting data characterizing the gait of the animal test subjects.

12 Claims, 12 Drawing Sheets

(56) References Cited

U.S. PATENT DOCUMENTS

| | | | | |
|---|---|---|---|---|
| 2015/0325004 | A1* | 11/2015 | Utsunomiya | G06K 9/00348 |
| | | | | 382/103 |
| 2016/0029954 | A1* | 2/2016 | Sato | A61B 5/6804 |
| | | | | 702/141 |
| 2016/0100801 | A1* | 4/2016 | Clark | A61B 5/7278 |
| | | | | 73/865.4 |
| 2017/0086711 | A1* | 3/2017 | Liao | A61B 5/1126 |
| 2019/0150793 | A1* | 5/2019 | Barth | A61B 5/7267 |
| 2020/0337272 | A1* | 10/2020 | Kumar | G06T 7/194 |
| 2021/0275098 | A1* | 9/2021 | Tian | A61B 5/6807 |

OTHER PUBLICATIONS

Nathan D. Neckel, Haining Dai, Barbara S. Bregman, Quantifying changes following spinal cord injury with velocity dependent locomotor measures, Journal of Neuroscience Methods, vol. 214, Issue 1, 2013, pp. 27-36, ISSN 0165-0270 (Year: 2013).*

Kappos, E. A., et al. (2017). Validity and reliability of the CatWalk system as a static and dynamic gait analysis tool for the assessment of functional nerve recovery in small animal models. Brain and Behavior, 7(7) doi:http://dx.doi.org/10.1002/brb3.723 (Year: 2017).*

Neckel, N. D. (Sep. 13, 2017). Novel spatiotemporal analysis of gait changes in body weight supported treadmill trained rats following cervical spinal cord injury. Journal of Neuroengineering and Rehabilitation, 14 doi:http://dx.doi.org/10.1186/s12984-017-0308-0 (Year: 2017).*

Jenkins GJ, Hakim CH, Yang NN, Yao G, Duan D (2018) Automatic characterization of stride parameters in canines with a single wearable inertial sensor. PLoS ONE 13(6): e0198893. https://doi.org/10.1371/journal.pone.0198893; published Jun. 14, 2018. (Year: 2018).*

Clark K, Caraguel C, Leahey L, Béraud R. Evaluation of a novel accelerometer for kinetic gait analysis in dogs. Can J Vet Res. Jul. 2014;78(3):226-32. PMID: 24982555; PMCID: PMC4068415. (Year: 2014).*

P. Jawayon, T. Khaorapapong, M. Chongcheawchamnan and W. Leelasamran, "Time-independent human gait modeling using accelerometry data," 2012 ICME International Conference on Complex Medical Engineering (CME), 2012, pp. 693-698, doi: 10.1109/ICCME.2012.6275642. (Year: 2012).*

Barthélémy, I., Barrey, E., Aguilar, P. et al. Longitudinal ambulatory measurements of gait abnormality in dystrophin-deficient dogs. BMC Musculoskelet Disord 12, 75 (2011). https://doi.org/10.1186/1471-2474-12-75 (Year: 2011).*

Cofré Lizama LE, Khan F, Lee PV, Galea MP. The use of laboratory gait analysis for understanding gait deterioration in people with multiple sclerosis. Multiple Sclerosis Journal. 2016;22(14):1768-1776. doi:10.1177/1352458516658137 (Year: 2016).*

M. Djurić-Jovičić and V. Miler-Jerković, "Intra-subjectstride-to-stride variability: Selecting subject's representative gait pattern," 2011 19thTelecommunications Forum (TELFOR) Proceedings of Papers, 2011, pp. 51-54, doi: 10.1109/TELFOR.2011.6143890. (Year: 2011).*

Haji Ghassemi N, Hannink J, Martindale CF, et al. Segmentation of Gait Sequences in Sensor-Based Movement Analysis: A Comparison of Methods in Parkinson's Disease. Sensors (Basel). 2018;18(1):145. Published Jan. 6, 2018. doi:10.3390/s18010145 (Year: 2018).*

* cited by examiner

Fig. 3 – Prior Art

MULTIDIMENSIONAL ANALYSIS OF GAIT IN RODENT

CROSS-REFERENCE TO RELATED APPLICATIONS

This application claims benefit of and priority to U.S. Provisional Patent Application No. 62/715,435 filed Aug. 7, 2018, which is incorporated by reference in its entirety.

STATEMENT REGARDING FEDERALLY SPONSORED RESEARCH

This invention was made with government support under HD067339-01A1 awarded by the National Institutes of Health. The government has certain rights in the invention.

BACKGROUND

The present invention relates to techniques for performing multidimensional analysis of gait in animals, such as rodents.

Locomotion is becoming a standard behavioral assay in all veins of animal research, and provides users with a plethora of locomotor data. A common practice in research to analyze this data is to run individual Analysis of Variance (ANOVA) tests on the means of select measures, such as stride length, cycle time, and duty factor. However, locomotion is not the summation of discrete independent values, but a nuanced coordinated interplay between these multiple moving parts that currently cannot be teased apart using existing approaches. Many of the measures provided by gait analysis devices are not independent of each other. Cycle time is not independent from duty factor (duty factor=stance time/cycle time); stride length is not independent from stride velocity (stride velocity=stride length/cycle time). As all locomotor measures, from right forelimb stride length to left hind paw angle, are physically attached to the same moving body, then it stands to reason that the measures reported by gait analysis devices are more likely to be dependent than independent. This is a problem in animal research as promising treatments may have failed when studies are being reproduced because the confound of gait variable interdependency was not consistently addressed from study to study.

Accordingly, a need arises for techniques for analyzing rodent gait that addresses the confound of interdependency of gait variables to provide more accurate and reproducible results.

SUMMARY

Embodiments of the present systems and methods may provide techniques for analyzing rodent gait that addresses the confound of interdependency of gait variables to provide more accurate and reproducible results. In embodiments, multidimensional analysis of gait in animals, such as rodents, may be performed.

For example, in an embodiment, a computer-implemented method of animal gait analysis may comprise capturing data relating to steps taken a plurality of animal test subjects, performing a multidimensional analysis of the captured data to generate data describing a gait of the animal test subjects, and outputting data characterizing the gait of the animal test subjects.

In embodiments, the data may be captured using an animal gait capture device. The captured data may be in a world coordinate frame and the multidimensional analysis may comprise identifying initial contact, mid-stance, and toe-off data for each animal test subject in the captured data, translating and rotating the identified data from the world coordinate frame to a coordinate frame of each animal test subject, isolating the steps of each animal test subject from the translated and rotated identified data and translating a time of each step to make a time of each initial contact time zero to form a dataset, and plotting the dataset to form a representation of the animal gait analysis. The multidimensional analysis may further comprise determining an error of the dataset and comparing datasets for a plurality of groups, each group comprising a trial of a plurality of animal test subjects. The comparing may comprise determining for each group a relative increase in the error of each dataset when a plurality of three-dimensional models are applied to each dataset.

In an embodiment, a system for animal gait analysis, the system comprising a processor, memory accessible by the processor, and computer program instructions stored in the memory and executable by the processor to perform capturing data relating to steps taken a plurality of animal test subjects, performing a multidimensional analysis of the captured data to generate data describing a gait of the animal test subjects, and outputting data characterizing the gait of the animal test subjects.

In an embodiment, a computer program product for animal gait analysis, the computer program product comprising a non-transitory computer readable storage having program instructions embodied therewith, the program instructions executable by a computer, to cause the computer to perform a method comprising capturing data relating to steps taken a plurality of animal test subjects, performing a multidimensional analysis of the captured data to generate data describing a gait of the animal test subjects, and outputting data characterizing the gait of the animal test subjects.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Figure 1:
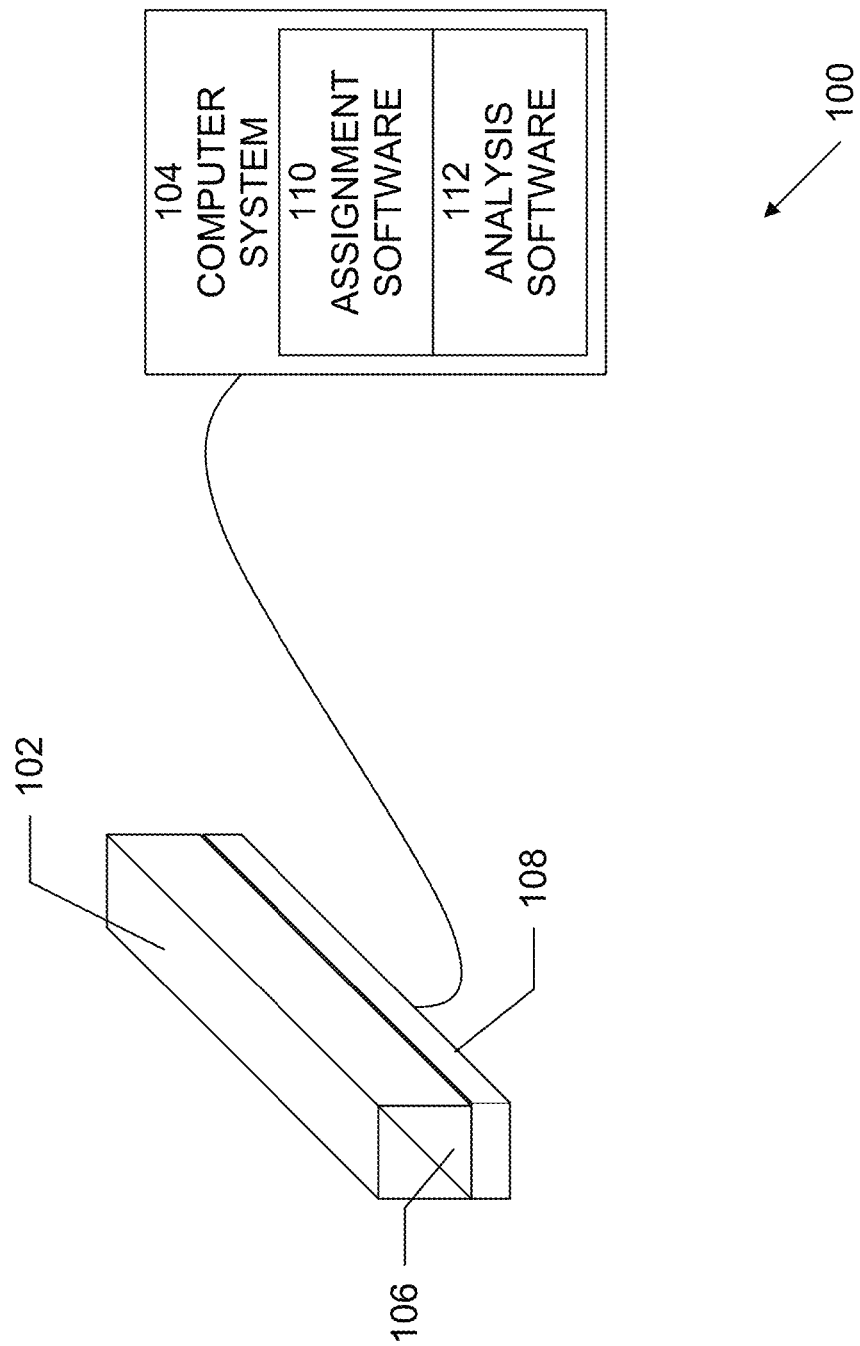
FIG. 1 illustrates an exemplary system in which embodiments of the present systems and methods may be implemented.

Embodiments of the present systems and methods may provide techniques for analyzing rodent gait that addresses the confound of interdependency of gait variables to provide more accurate and reproducible results. In embodiments, multidimensional analysis of gait in animals, such as rodents, may be performed.

Gait analysis is a powerful, but complex, tool that helps researchers to quantify behavioral differences between test groups. Commercially available automated gait analysis systems enable researchers to quickly and easily gather enormous amounts of data. In traditional gait analysis multiple interdependent factors are studied, but analyzed and reported as independent factors. This can lead to the generation of errors such as reporting the same finding multiple times. A comparison would be to report the radius, diameter and circumference of different marbles—if one factor is different, then all of the other dependent factors would also most likely be different too. More specific to gait analysis, it is hard to interpret data showing improvements in factors such as stride length and cycle times if they remain completely uncoordinated. Earlier techniques have attempted to address these concerns of interdependence. The behavior of one limb will affect the behavior of the others, simultaneously in both time and space. Embodiments of the present systems and methods may embrace this multidimensional interdependency of rodent gait rather than isolating individual parameters. In embodiments, by rotating the data out of the world coordinate frame and into the coordinate frame of the animal, the influence of the animals not walking in straight lines parallel to the coordinate frame of the software may be reduced. In embodiments, techniques have been extended to keep this data as whole as possible, and not break it up into discrete values such as right forelimb stride length or left hindlimb duty factor. When a step is looked at as the simple change of x,y,t of all 4 limbs as the reference limb progresses from toe off to subsequent toe off, our multidimensional measure appears. This helps maintain the link between time and space in gait analysis.

Traditional measures such as stride length ($\Delta x$) and base of support ($\Delta y$) may be similar, but if they occur at different times in the reference limb step cycle ($\Delta t$), is it really a similar step? If only limb spatial measures are reported and not interlimb temporal measures one may falsely conclude that the steps are similar. Embodiments of the present techniques may be applied to assess the locomotor recover of rats after a C4/5 right over-hemisection injury. This revealed significant changes after injury, but embodiments of the present techniques may provide the capability to track the restoration of function and the development of compensatory techniques while minimizing the confound of measuring multiple dependent variables.

The analytical modification that gait variables in test animals have velocity dependence may better capture the gait signature of animal models. However controlling only for velocity also has statistical limitations. By focusing on the velocity dependence of stride length it is possible to overlook the phasing dependence of stride length, or the body angle dependence of stride length. Instead of digging deeper to uncover relationships between all of these measures it is better to take a step back and take a more holistic view. All of the measures exported by gait analysis devices are essentially manipulations of the recorded x, y, and t data. For example, stride length=$\Delta x$, base of support=$\Delta y$, duty factor=$(t_{IC2}-t_{IC1})/(t_{IC2}-t_{IC1})$. By plotting the data in its original x, y, t form the multidimensional interdependencies of gait will theoretically become apparent. Essentially, individual variables of locomotion become redundant as the simultaneous change in x, y, t will itself be the measure.

In embodiments, the present systems and methods may provide techniques to quantify the changes in rodent locomotion following a neurological injury. These techniques may take the data exported from a rodent gait analysis device, such as the commercially available CATWALK®, and may transform it in a manner to reduce the influence of interdependency among common gait variables. This may result in a whole body view of locomotion that captures the nuanced coordinated interplay between limbs. Embodiments may show that rats have impaired gait following a spinal cord injury and spontaneously develop compensatory techniques five weeks after injury. Further, embodiments may demonstrate that a murine model of traumatic brain injury does not result in altered gait up to four weeks post injury.

An exemplary system 100 in which embodiments of the present systems and methods may be implemented is shown in FIG. 1. System 100 may include animal gait capture device 102 and computer system 104. An example of animal gait capture device 102 is the CATWALK XT10.1® gait analysis system from NOLDUS INC® of the Netherlands. In this example, the animal gait capture device 102 may include animal walkway 106 and digital camera 108. Animal walkway 106 may include a glass walkway with an internally reflecting light, such as a green light. When an animal paw contacts the glass, light is reflected down and may be recorded by digital camera 108. Digital camera 108 may be communicatively connected to computer system 104, which may receive data from digital camera 108, and which may control the operation of digital camera 108, the lighting of animal walkway 106, and any other electrical or mechanical apparatus that may be utilized.

Computer system 104 may include assignment software 110 and analysis software 112. Assignment software 110 may include standard software associated with animal gait capture device 102. Assignment software 110 may provide the capability for users to assign the recorded prints to identify the time and location of steps. Analysis software 112 may then analyze the rodent gait. Analysis software 112, may include custom software and may be implemented, for example, using MATLAB® from MATHWORKS INC.® of Massachusetts.

Figure 2:
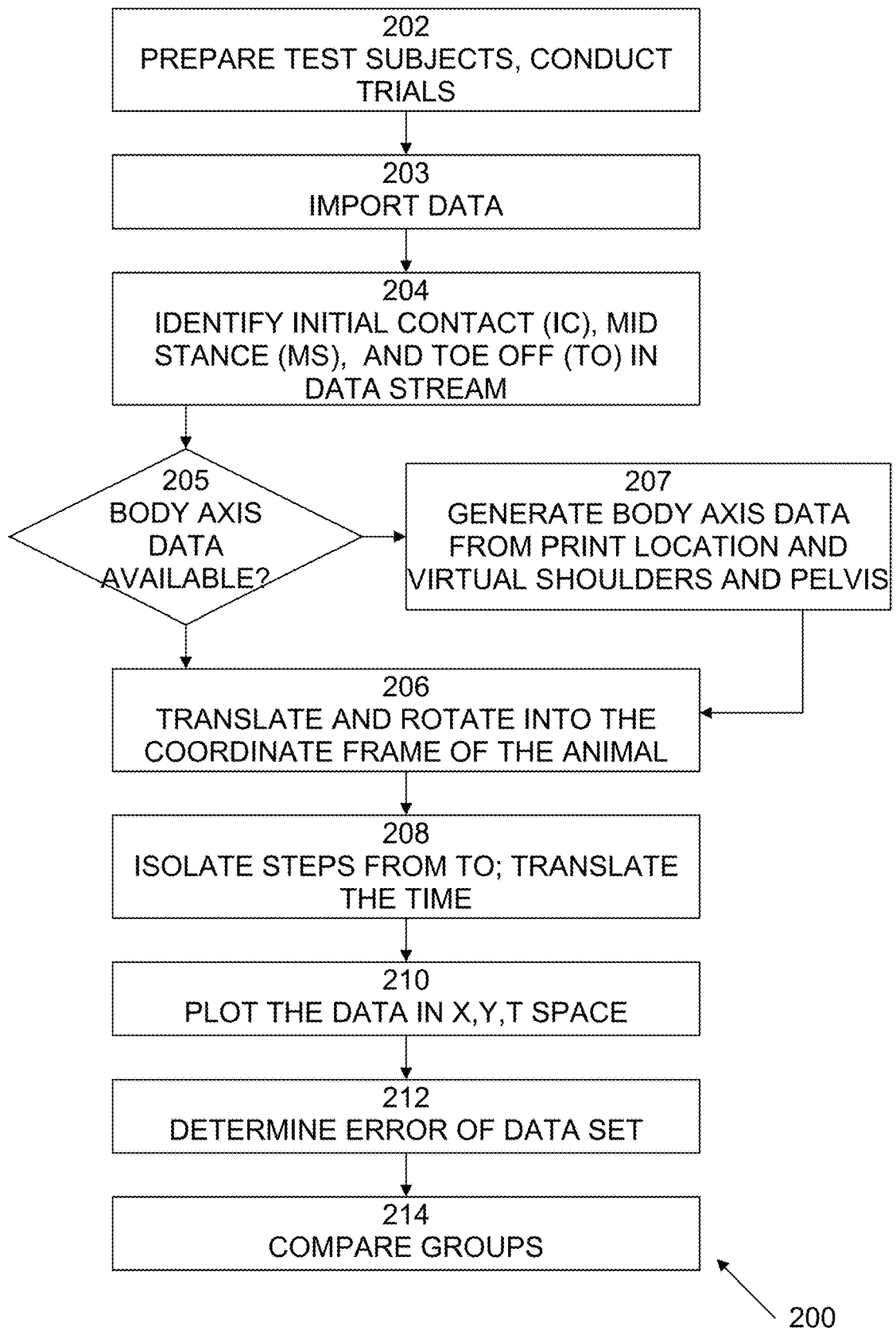
FIG. 2 is an exemplary data flow diagram of a process according to embodiments of the present systems and methods.

An exemplary flow diagram of a process 200 of multidimensional analysis of gait in animals, such as rodents, is shown in FIG. 2. Process 200 begins with 202, in which test subjects may be prepared and trials may be conducted, examples of which are described below.

Materials and Methods. All animal protocols were approved in advance by Georgetown University Animal Care and Use Committee. All animals were housed in the Georgetown University Division of Comparative Medicine with unlimited access to food and water. At no point were food deprivation or food rewards used as motivators.

Rats and Spinal Cord Injury Protocol 108 adult female Sprague-Dawley rats were used (appx 5 weeks old, 160-220 g range, 186±12 g mean, Taconic Farms, Germantown, N.Y.). The rats are part of our ongoing robotic gait training studies and we have previously reported a non-linear regression gait analysis of 46 of these animals[4] and an irregular conical gait analysis of 74 of these animals.[7] Presented here for the first time is novel multidimensional gait analysis of 108 animals.

Rats received a right over-hemisection injury at the C4-5 level which bilaterally ablates the dorsal corticospinal pathway, and unilaterally ablates the contralateral rubrospinal pathway. This results in profound asymmetric impairments, with the right side more impaired than the left, and the forelimbs more impaired than the hind. Thus this model is ideally suited to investigate spontaneous asymmetric gait recovery and development of compensatory techniques. The surgery has been previously described but briefly, rats were anesthetized with 3% isoflurane, a partial C4/C5 laminectomy was done, and iridectomy scissors were used to create a lesions at C4-5. At the end of the study all lesion sites were reconstructed from serial cresyl violet sections or MRI images. We only included the 77 animals with appropriate injuries in post-injury analysis. A subset of 19 untrained animals was then tested weekly for an additional 6 weeks starting on post-injury day 11 and ending on post-injury day 46 (hereafter referred to as weeks 2 through 7). Frequently not all 19 animals took appropriate steps for each week, therefore the total N for each week varies from 15 to 19.

Mice and Traumatic Brain Injury Protocol For CCI surgery, the contusion occurred over the sensory cortex, as previously described.[10,11] We compared sham mice (n=12) to CCI mice (n=13). Wildtype C57Bl/6 male mice were purchased from Jackson Laboratories (Bar Harbor, Me.) and were 3-4 months old at the time of injury. CCI mice were administered surgical anesthesia using 4% isoflurane with maintenance in 2%, at flow rate of 1-1.5 L/min in freely breathing oxygen. Bupivicaine was administered intradermally to the surgery site, a 10 mm midline incision was made over the skull, the skin and fascia reflected and a craniotomy performed (4 mm) on the central aspect of the left parietal bone. The impounder tip of a Leica StereoOne Impactor was sterilized, positioned to the surface of the exposed dura, and set to impact the cortical surface at 5.25-m/s velocity, 2 mm tissue deformation. The skull was replaced after injury. Sham mice received isoflurane anesthesia, skin incision and reflection, but no impact or craniotomy. After injury, the incision was closed with wound clips, anesthesia discontinued, 1 ml saline administered by intraperitoneal (i.p.) injection and the mouse placed in a heated cage to maintain normothermia for a 45 min recovery period.

CatWalk Protocol. For 3 non-consecutive days animals were pre-trained on the animal gait capture device 102 before pre-operative overground locomotion was recorded. No time, velocity, or directional constraints were placed on the trials as animals were allowed to cross the walkway at their own self-selected walking speed. The trial was considered complete once several walking steps were recorded from each limb. This could be accomplished from as few as one complete pass, or from several partial passes. Trotting or galloping steps were omitted. As to not bias the group data towards animals that took more steps, a cap of 15 steps per animal was applied. These 15 steps were not randomly chosen, but were selected from the steps that were most similar to each other. One week after injury, with no re-training the overground locomotion of the animals was re-assessed with the animal gait capture device 102 and weekly thereafter.

Figure 3:
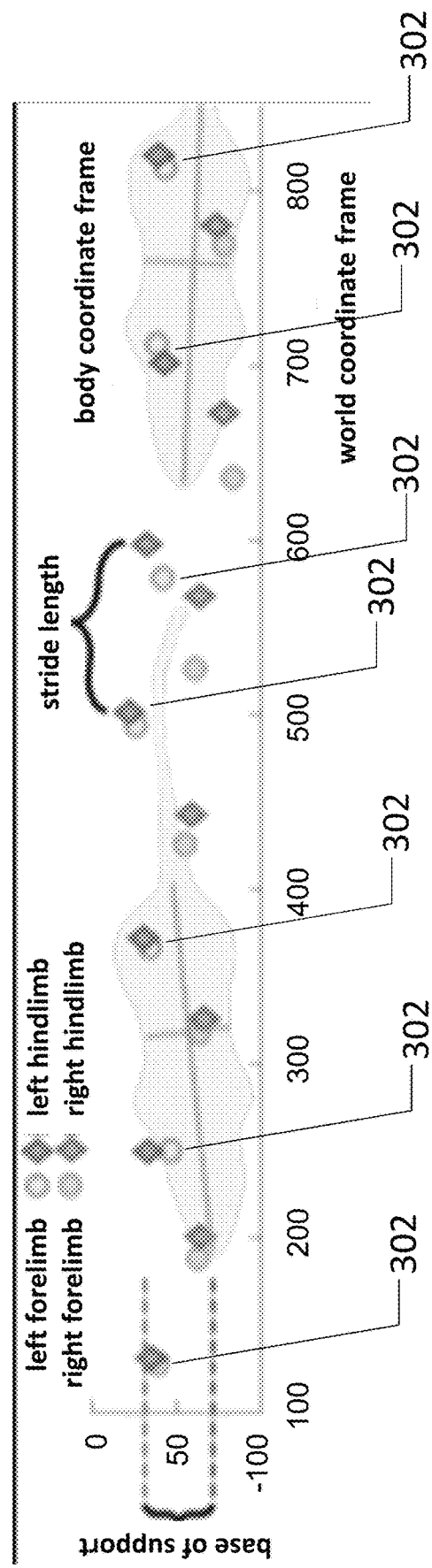
FIG. 3 is an exemplary illustration of the gait of an animal test subject.

The data from the trials conducted at 202 may then be analyzed in accordance with 203-214 in FIG. 2. At 203, the data from the trials conducted at 202 may be imported from animal gait capture device 102. At 204, the datastream from the trials that were conducted may be analyzed to identify information such as the initial contact (IC), mid stance (MS), and toe off (TO). Animal gait capture device 102 may record the time and location of paw prints as the animals walk. The locations of the paw prints may be determined by applying a calibrated pixel grid to the field of view. This pixel grid may be termed the world coordinate frame. Once a cluster of pixels is defined as a paw print, a number of measurements can be made. FIG. 3 shows a representative rat walking from right to left with stride length defined as the distance from one print to the next and base of support as the difference between average right paw y (top to bottom) position and average left paw y position.

This technique works well when the animals walk in perfectly straight lines parallel to the world coordinate frame. However, this does not take into account the natural listing and wandering of a walking rodent. The use of a fixed world coordinate frame can introduce consistent variation and error as the rodent walks with a variable body angle. A second error that may be introduced when using a fixed world coordinate frame is the generation of phantom strides from impaired limbs. An example of this is in SCI rats where the front right limb has a severely reduced range of motion, and is only placed on the CatWalk while the less impaired left limb is in swing. While there is weight bearing on this injured right limb, there is minimal active stride being produced. However, by only recording the placement of the right forepaw prints on a fixed frame, the automated software records the movement of the limb across the CatWalk as a stride.

Figure 4:
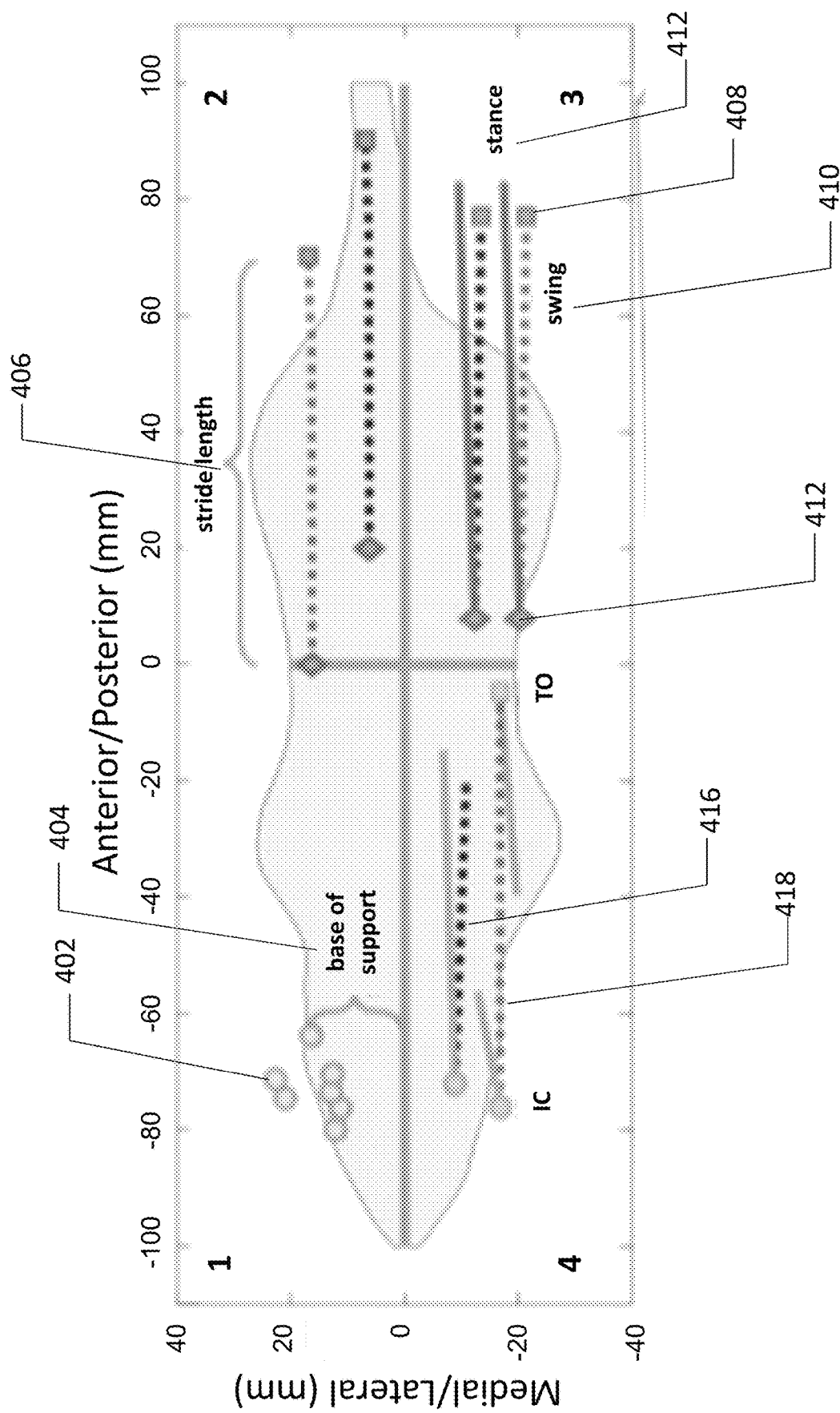
FIG. 4 is an exemplary illustration of the translation of gait data of an animal test subject.

At 205, it may be determined whether animal body axis data is available in the data imported from animal gait capture device 102. If so, than at 206, the above-described errors may be corrected by translating and rotating the x,y position of the paw prints out of the world coordinate frame and into the coordinate frame of the animal. For example, the seven left forepaw prints 302 from FIG. 3 may be translated to the seven left forepaw initial contacts 402 in quadrant 1 of FIG. 4, making the base of support the distance in the medial/lateral direction ($\Delta y$). Translating the prints into the body coordinate frame of the animal corrects for errors induced by animals not walking in straight lines parallel to the world coordinate frame. As seen in FIG. 4, this has the added benefit of showing the different medial/anterior positioning of equal stride lengths. Further, the animal body axis data may be used for the translation and rotation.

If, at 205, it is determined that animal body axis data is not available in the data imported from animal gait capture device 102, then at 207, animal body axis data may be generated from the locations of the animal paw prints and from virtual animal shoulders and pelvis information that may be generated or obtained. The process then continues with 206.

At 208, the animal steps may be isolated from toe off to the subsequent toe off of the reference limb (such as the right hindlimb). The time to make initial contact equal to zero may be translated, thus making the swing phase negative in time and the stance phase positive in time. For example, when the toe off of a single left hindlimb is compared to the subsequent initial contact in quadrant 2 of FIG. 4, it may be seen that stride length 406 is the difference in anterior/posterior direction ($\Delta x$).

Quadrant 2 of FIG. 4 also shows the translation of two different strides with equal stride lengths. It may be uncertain if two stride lengths were truly equal if they occurred at different body positions. And what about if these equal stride lengths happened at different times? Not just different limb cycle times, but at different times in inter-limb phasing. Locomotion is not just a bunch of independent spatial and temporal measures. Locomotion is how all limbs move together in space and time. And it shouldn't matter if there is a sophisticated mathematical expression correlating one measure (like right hind paw stride length) with another (like left forepaw cycle time) or not, locomotor measures are not independent variables; all of the measures generated by animal gait capture device 102 are physically attached to the same moving body.

Reference Limb Referenced Motion To address these concerns, embodiments of the present systems and methods may capture the multidimensionality of gait. Quadrant 3 of FIG. 4 shows a complete step cycle of two right hindlimb steps from toe off 408, through swing phase 410, to initial contact 412, and through stance phase 412. While these two right hindlimb steps are very similar, we also need to track the motion of the other limbs during the gait cycle of these reference limbs. In quadrant 4 of FIG. 4, the corresponding right forelimb motion during the respective right hindlimb reference steps is shown. While the right hindlimbs are taking similar steps, one right forelimb transitions from swing to a more medial stance 416 and the other step is finishing a more lateral stance before continuing through a complete swing phase, and a little bit of early stance 418. This shows two very different locomotion patterns during two very similar reference limb steps.

Figure 5:
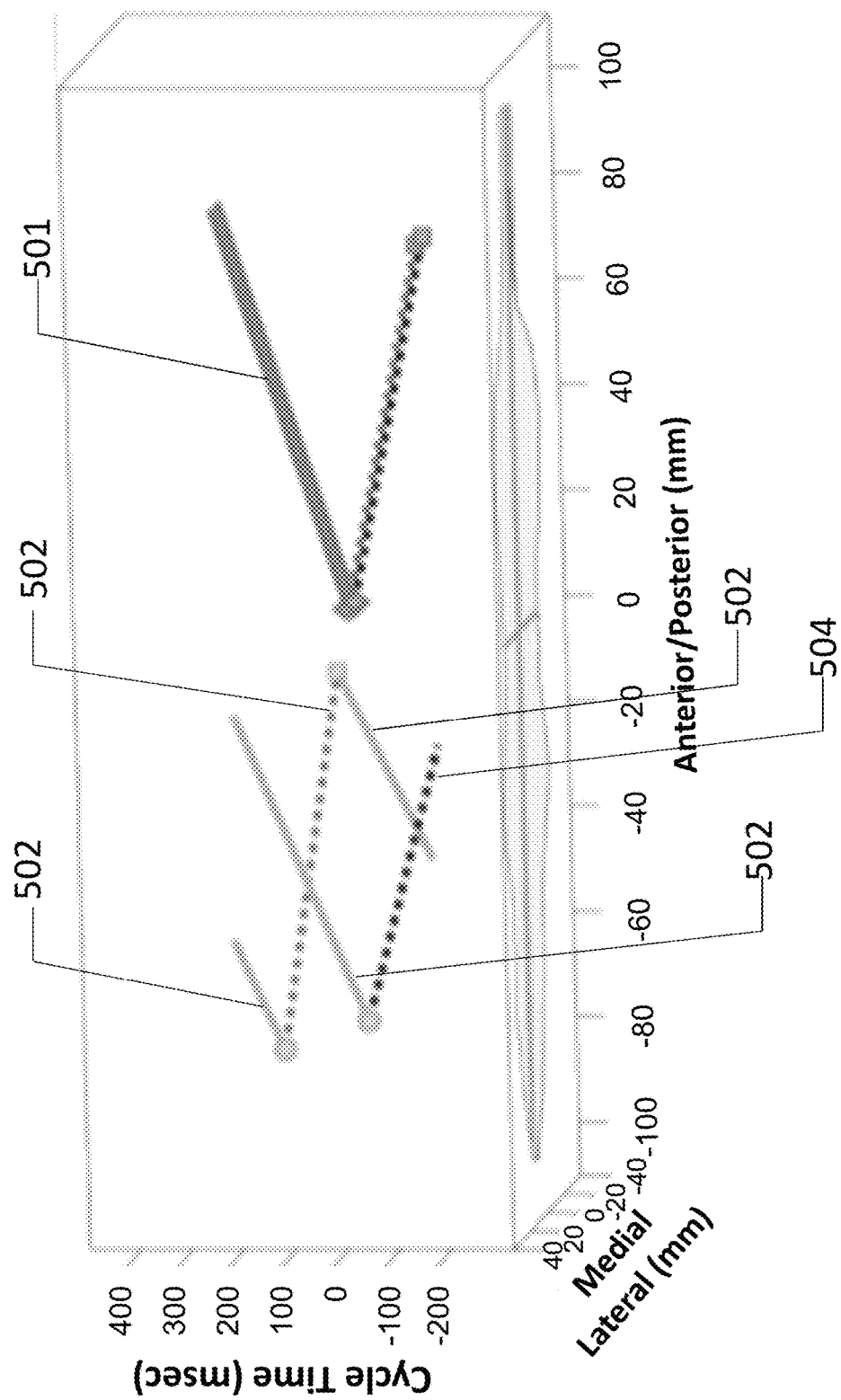
FIG. 5 is an exemplary illustration of the temporal translation of gait data of an animal test subject.

The timing of such behavior is just as important as the position. In FIG. 5, these two steps are plotted in the third dimension of reference limb cycle time, with initial contact at time 0. When the third dimension of time is added errors in coordination can be seen. Time is expressed as the cycle time of the reference limb (right hindlimb) with initial contact at time 0. During two very similar right hindlimb steps the right forelimbs are very differently coordinated, even though the right forelimb cycle times and stride lengths may be similar. If there were differences in right hind limb cycle time the lines 501 would have different ranges in the t dimension. If they had different duty factors they would have different proportions of negative/positive times. And if the steps were occurring at different speeds the slower step would be more open while the faster step would be more closed (greater distanced covered in less time). Additionally, the forelimb traces 502 of FIG. 5 express the phasing differences in these two steps. The steps 504 are in phase, with swing and stance occurring at the same time, while the steps 506 are out of phase. Embodiments of the present systems and method may present a multidimensional measure of locomotion for the entire animal. A measure that equally combines the timing of a step, the location of a step, the location of the other limbs, and the interlimb phasing of a step into one representation of locomotion.

Grouping Multidimensional Data. At 210, in order to quantify the many steps from several animals in an experimental group, embodiments may utilize techniques for grouping steps in animal gait capture device 102 and generating 3D models to represent the multidimensional, interlimb, behavior of walking animals. For example, the data may be plotted in x,y,t space. For each limb, at each percent of the gait cycle, the 68.27% of points that are nearest each other within a boundary may be enclosed. The residual distance from the remaining 31.73% of points may be measured.

Figure 6:
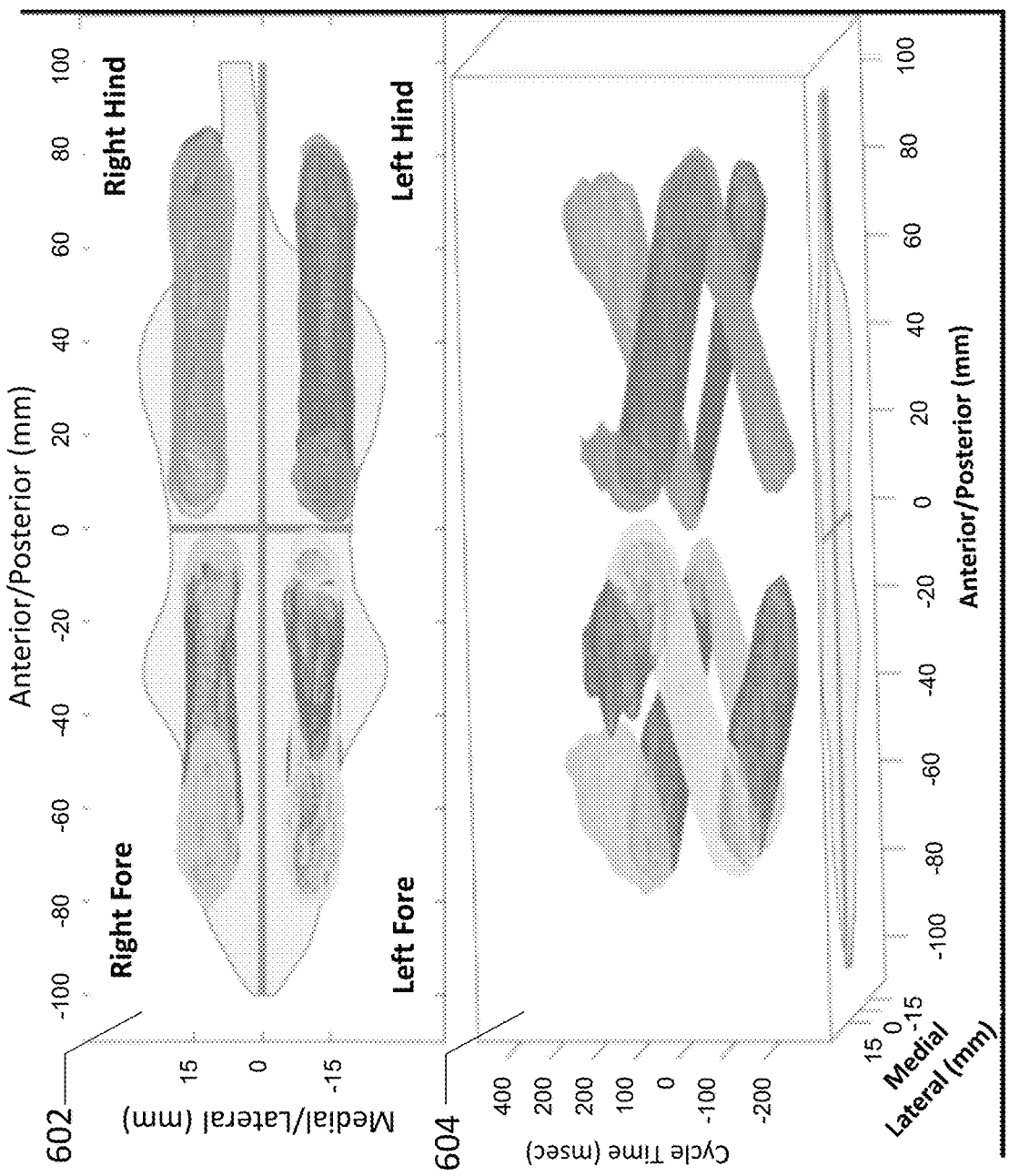
FIG. 6 is an exemplary illustration of composite model throughout the entire gait cycle of an animal test subject.

FIG. 6 illustrates a composite model throughout the entire gait cycle of 108 naive female rats. The upper portion 602 of FIG. 6 shows a superior view of the animal, and the symmetry of the gait of normal animals is readily apparent. The tightness of the meshes indicates a very consistent stepping pattern with symmetric stride length, no crossing over the midline body axis, and a wider hindlimb base of support than forelimb. The steps of 108 healthy rats are fitted with the smallest mesh that contains 68.27% of the data resulting in a multidimensional model of healthy gait. The lighter meshes represent stance phase and darker grey represents swing. Healthy gait is consistent (small mesh volumes) with right/left symmetry, as shown in upper portion 602 of FIG. 6.

The basic concept is to fit the densest cluster of 68.27% of the data with a boundary, leaving the remaining 31.73% with a 3D residual distance to the boundary. This process may be repeated for every 1% of the reference limb gait cycle. In embodiments, only data points of similar swing/stance phases may be grouped. For example, at 25% of the reference limb (right hind) gait cycle, two different steps may have their left forelimb at similar locations in space/time. But if one just started stance while the other is finishing up swing, they should not be grouped together, for the phases are distinctly different.

The lower portion 604 of FIG. 6 illustrates temporal aspects of gait. By introducing the third dimension of time (right hindlimb cycle time with initial contact at time 0) intra and interlimb coordination can be observed. The fore and hindlimb pairs are out of phase while the diagonal pairs are in phase. As the right hindlimb begins swing with toe off (dark grey) the left forelimb is already in swing, while the left hindlimb (light grey) and right forelimb (light grey) are in stance. Before initial contact of the right hindlimb, the right forelimb begins to transition to swing. The overlap of swing and stance phases indicates the variability of healthy gait. 20 msec before right hindlimb initial contact, the right forelimb is sometimes in late stance and sometimes it is in early swing. While this is traditionally measured with coordination pattern labels such as Aa or Ab, the technique presented here enables us to determine the actual timing difference of such coordinated events. The hindlimbs are out of phase, with periods of initial dual stance around initial contact of the right hindlimb and terminal dual stance with the initial contact and early stance phase of the left hindlimb, as indicated by the small region of light grey at the top of the left hindlimb trace. This phasing is mirrored in the forelimbs, with the left forelimb initiating swing before toe off of the right hindlimb (region of swing at top of lightest grey trace).

Quantification of Differences in Multidimensional Gait Analysis. As described above, a method for quantifying differences in multidimensional gait with rats in animal gait capture device 102 may include test groups consisting of a set of data points and a 3D model that encloses 68.27% of the points. The remaining 31.73% of points have a residual distance to the model. At 212, the product of this sum of residuals, model volume, and ratio of points outside to inside may be computed to form the measured error.

At 214, groups may be compared by measuring the relative increase in error from switching 3D models. For example, when comparing experimental groups A and B, 3D model A will be applied to data points B, and model B to points A. This will increase the error of both, as more points will be outside the model, possibly with a greater distance to the model. If healthy animals are assumed to be symmetric, applying the left model to the right data points, and vice versa, will have a minimal increase of error. This increase in error represents the naturally occurring variability in healthy data. When comparing two experimental groups, if the increase in error is more than twice this limit it may be considered statistically significant. For quadrapedal rodents, the error of each limb may be individually determined, before the four limbs are summed to get an overall relative error score. This method may assess the locomotor deficits and the time course of spontaneous recovery in a rat model of spinal cord injury and a mouse model of traumatic brain injury. By comparing the multidimensional error over the course of several weeks, both the recovery of function as well as the development of compensatory techniques may be observed.

Figure 7:
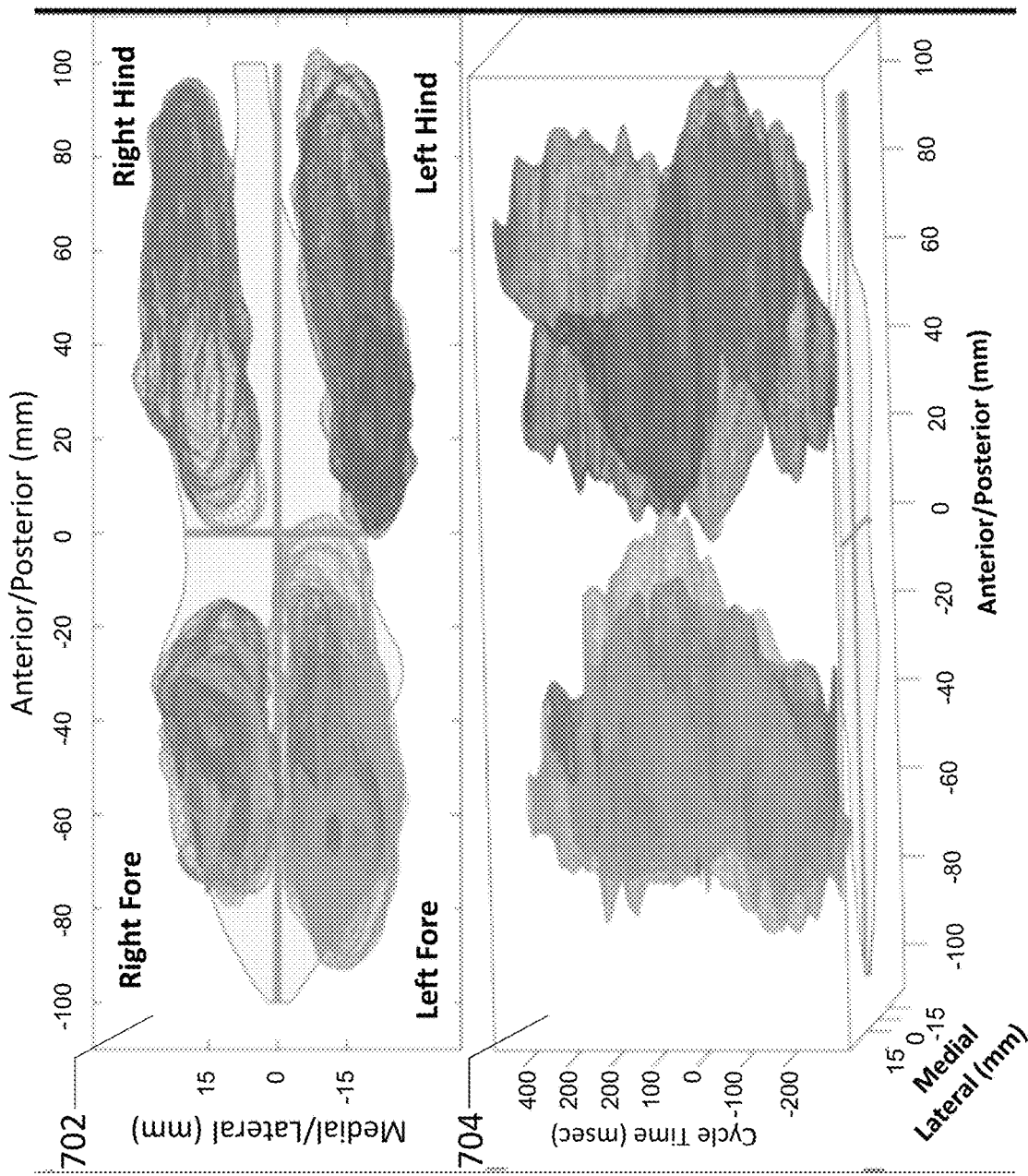
FIG. 7 is an exemplary illustration of multi-dimensional gait analysis of a plurality of animal test subjects.

Spinal Cord Injury Alters Locomotion. Following a spinal cord injury impaired locomotion is readily apparent; the animals struggle to make it across the walkway. And traditional gait analysis techniques result in a plethora of measures being significantly different and are difficult to interpret as locomotor measures are all related, and not independent. FIG. 7 illustrates a multi-dimensional gait analysis of 77 rats 1 week after a C4/5 right over-hemisection injury. These are fitted with the smallest mesh that contains 68.27% of the data resulting in a multidimensional model gait. The meshes represent stance phase and swing. The upper portion 702 of FIG. 7 illustrates impaired consistency (large mesh volumes) and right/left asymmetry is apparent, along with altered body axis. This demonstrates that all limbs exhibit a reduced consistency of stepping with a larger volume in medial/lateral direction compared to preinjury baseline (based on visual inspection). The forelimbs show the expected asymmetric impairment of reduced right forelimb stride length and increased left stride length. And the hindlimbs show a previously unobserved pitch. As the impaired rats walk across the glass the less impaired left forelimb over-compensates and crosses the midline, resulting in a slanted body axis. When translated into the body coordinate frame, the slanted body axis becomes a slanted limb path.

The lower portion 704 of FIG. 7 introduces the third dimension of time (right hindlimb cycle time with initial contact at time 0) and complete disruption intra and interlimb coordination can be observed. This shows that all limbs exhibit prominent changes in intralimb phasing and interlimb coordination. By definition with this method, the reference right hindlimb goes through swing in negative cycle time and stance in positive cycle time, but this motion is much more variable (larger volume) than in the preinjury baseline. Additionally, following injury the other limbs do not maintain a well-defined separation of swing/stance phase (more dark grey and light grey volumes occupy the same space). In the preinjury analysis, it was observed that when the right hindlimb begins swing the left forelimb was in sync, and also in swing phase. The other diagonal pair, left hindlimb and right forelimb, was .about. 180 out of limb phase and in stance. Following spinal cord injury there is no consistent coordination. When the right hindlimb begins swing, the forelimbs can be found in just about any phase and any position in body space. The left hindlimb maintains a semblance of shape with the limb moving back as the right hindlimb moves forward, but not having two distinct stance volumes is a clear indication of disrupted coordination.

Figure 8:
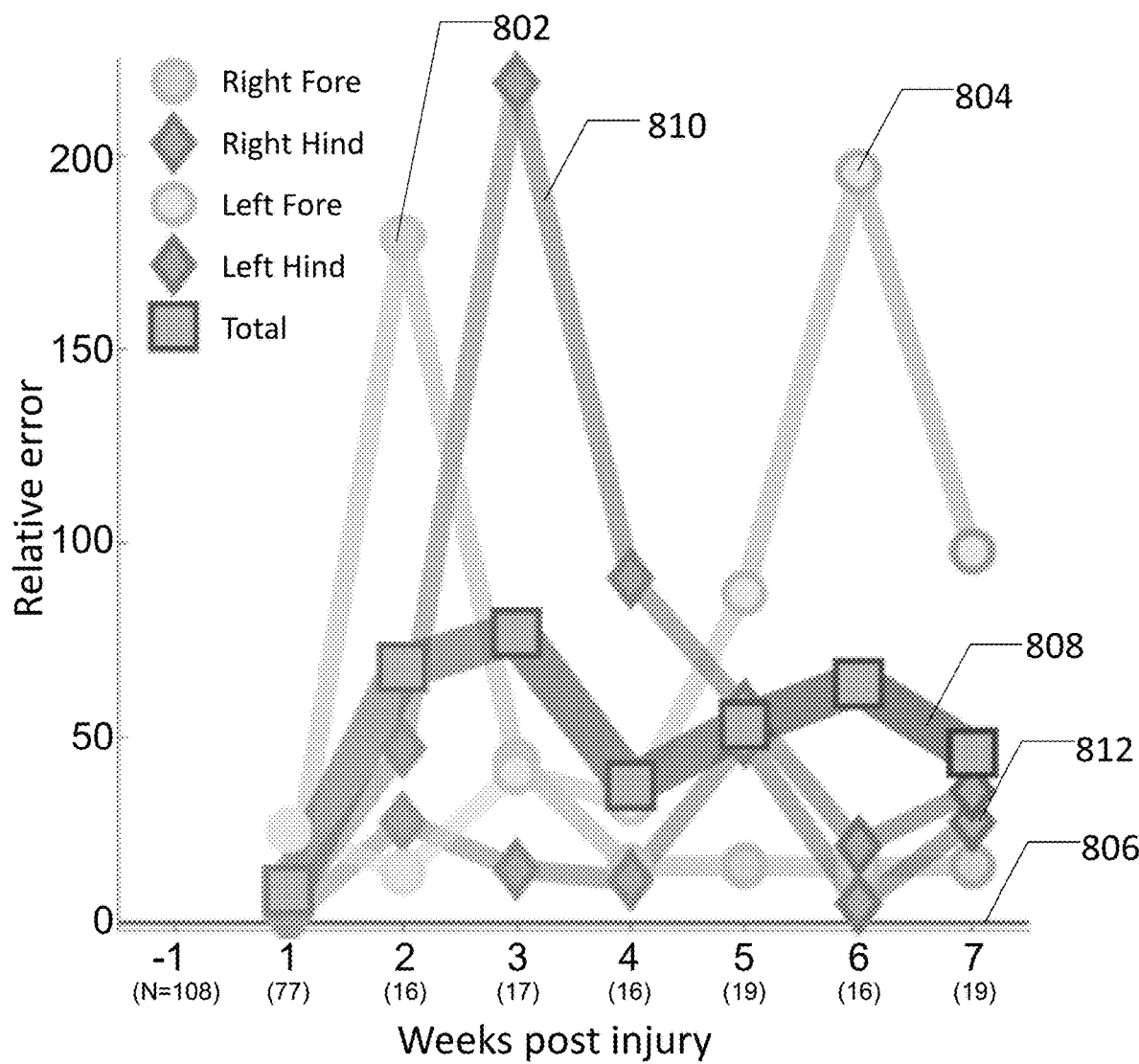
FIG. 8 is an exemplary illustration of spontaneous recovery of animal test subjects.

Spontaneous Recovery of SCI Rats is Asymmetric. As shown in FIG. 8, the spontaneous recovery of SCI rats is asymmetric. Over time some limbs recover while others develop compensatory techniques. The more impaired right forelimb 802 begins as the limb with the greatest difference from pre-injury. Over time right forelimb 802 becomes much less different, at the expense of the other limbs, particularly left forelimb 804. The less impaired limbs, with their greater range of motion and control, take more abnormal steps in order to have the more impaired limb take as normal a step as possible. Line 806 at RE 2.0 represents the cutoff for significant difference.

Figure 9:
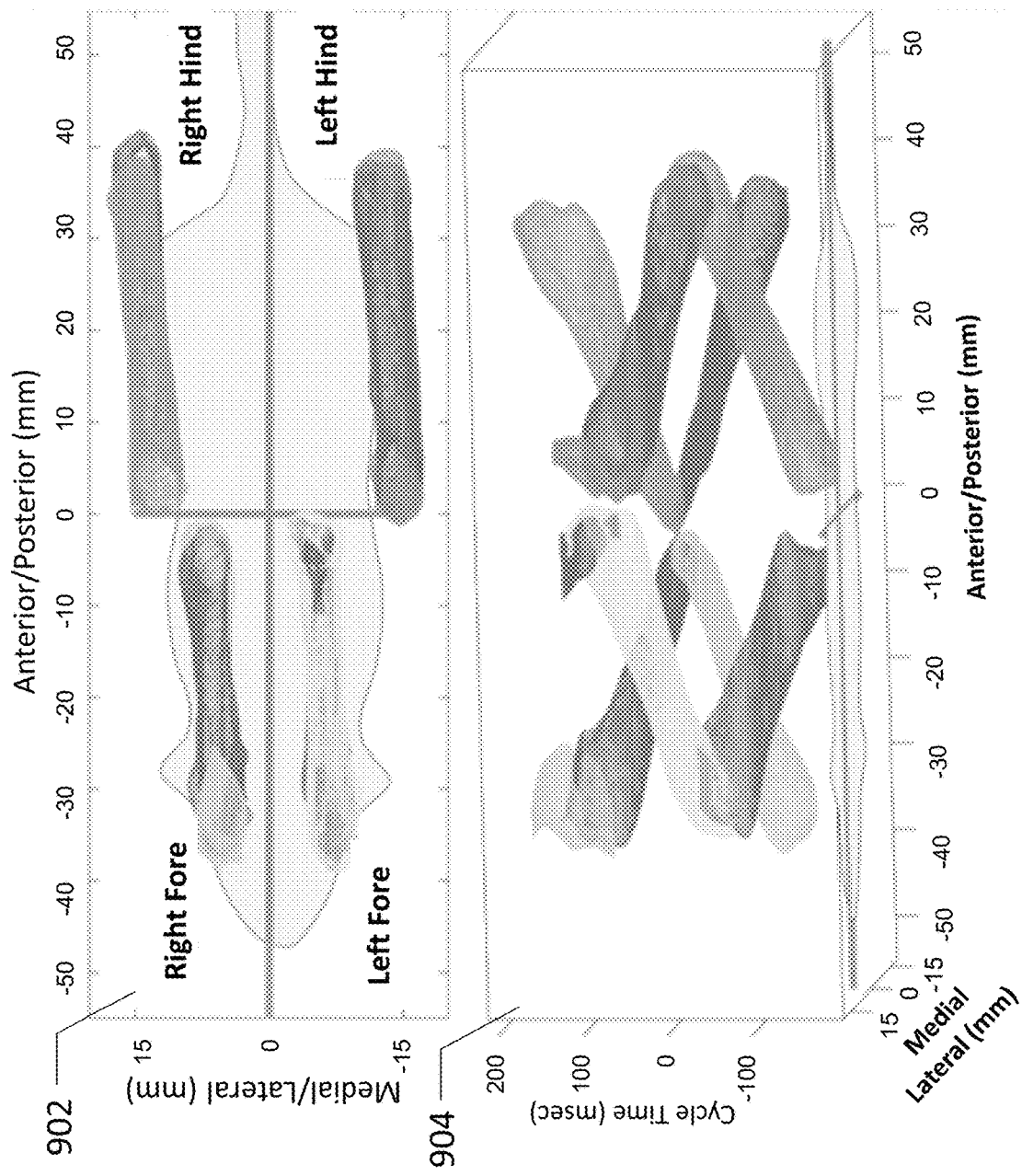
FIG. 9 is an exemplary illustration of multidimensional motion of sham animal test subjects.

One week after a C4/5 over-hemisection injury the multidimensional locomotion of the 77 untrained rats is significantly different from the 108 rats pre-injury with a relative error (RE) of 10.35. This difference increases to a peak at week 3 of RE 76.83 before a decline to RE 45.78 by week 7. Line 808 of FIG. 9 shows that the total locomotion of untrained animals is most different from pre-injury values 3 weeks after injury. When this whole-body error measure is separated into the component limbs it may be seen that each limb behaves differently. One week after injury all limbs are equally significantly different from pre-injury, but at week two the right forelimb 802 is much more different from pre-injury (RE 178.86) than the other limbs. This difference quickly decreases over time and for weeks 4 through 7 the RE is less than 17. The left hindlimb 810, which was moderately different one week after injury (RE 5.82) continues to deviate its multidimensional gait patterns away from pre-injury levels so that by week 3 it is the most different with a RE of 218.69. This difference subsides, and the relative error is less than 35 for weeks 6 and 7. After injury, left forelimb 804 is significantly different from pre-injury levels, and maintains a similar level of difference for the first for weeks post injury (RE less than 41). By the fifth week post injury left 804 forelimb begins to deviate even further away from pre-injury levels, with a peak of RE 195.71 at week 6. Right hindlimb 812 is the only limb that maintains a consistent amount of difference from pre-injury levels over the seven weeks of this study (RE less than 50).

Cortical impact of the parietal cortex does not alter gait. To further characterize our novel method of gait analysis we applied it to mice to measure locomotor changes following CCI. FIG. 9 shows the multidimensional motion of sham mice. The upper portion 902 of FIG. 9 shows the paw placement of the 12 sham-injured mice. Similar to our pre-injury rats, sham mice have a consistent stepping pattern, with right/left symmetry, consistent stride length, and no crossing of the medial/lateral midline. Unlike rats, mice have a greater difference in forelimb and hindlimb support base support, with the hindlimbs extending more caudally and even crossing the anterior/posterior midline. The steps of 12 sham injured mice were fitted with the smallest mesh that contains 68.27% of the data resulting in a multidimensional model of healthy gait. Light grey meshes represent stance phase and dark grey represents swing. The upper portion 902 of FIG. 9 shows that sham mouse gait is consistent (small mesh volumes) with right/left symmetry. The forelimb base of support is narrower than the hindlimbs.

By introducing the third dimension of time (right hindlimb cycle time with initial contact at time 0) intra and interlimb coordination can be observed, as shown in the lower portion 904 of FIG. 9. The fore and hindlimb pairs are out of phase while the diagonal pairs are in phase. Lower portion 904 of FIG. 9 shows highly coordinated limb movements, with the reference right hindlimb exhibiting very consistent swing and stance phasing. Like pre-injury rats, sham mice have a predictable gait pattern. The left forelimb of sham mice is in phase with the right hindlimb and the other diagonal pair, the right forelimb and left hindlimb, is also in phase with each other, and out of phase with the reference limb.

Figure 10:
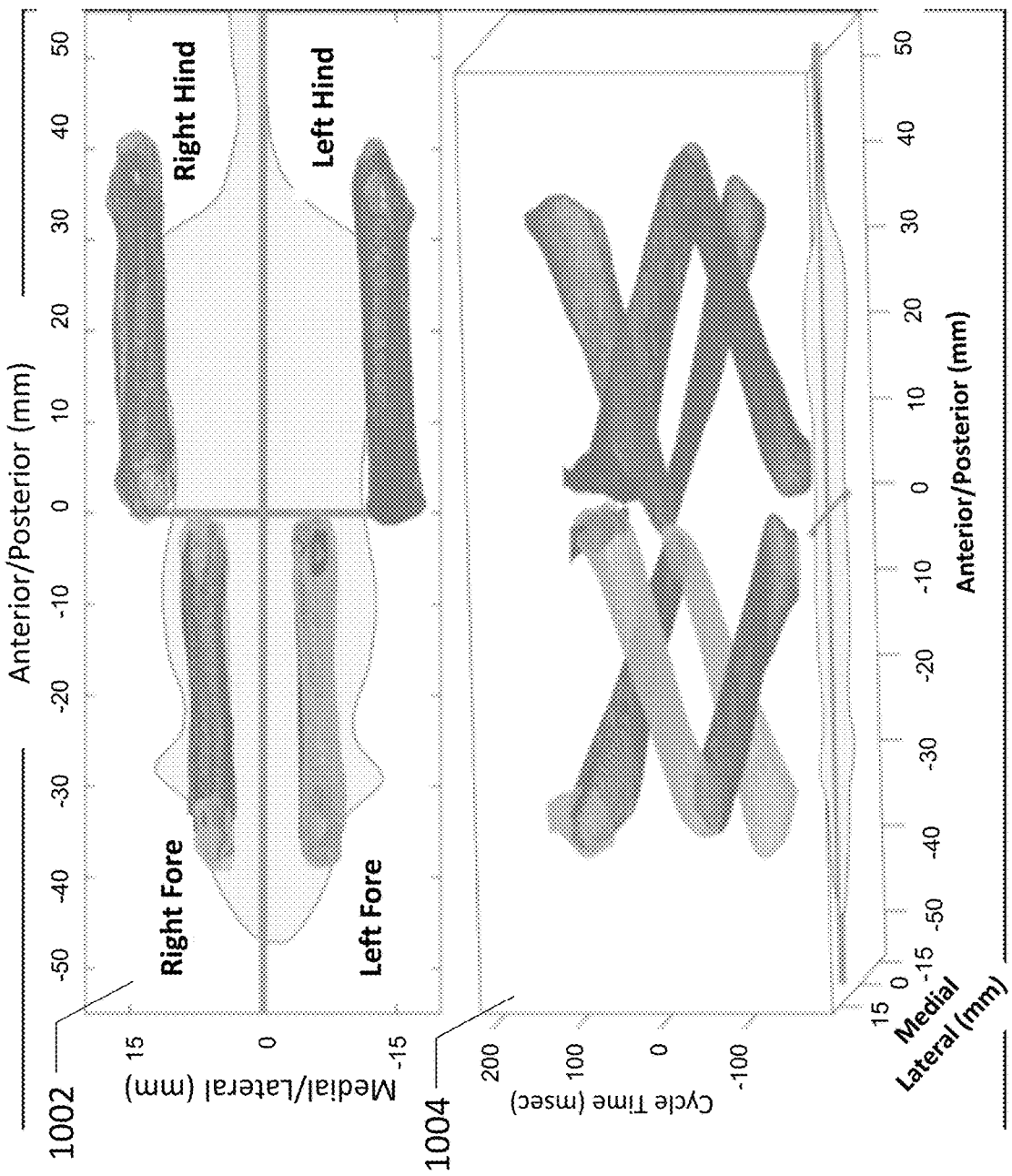
FIG. 10 is an exemplary illustration of the multidimensional gait of a plurality of animal test subjects.

FIG. 10 illustrates the multidimensional gait of CCI mice at one week post-injury and shows that TBI does not alter multidimensional motion. The steps of 13 mice one week after a CCI injury are fitted with the smallest mesh that contains 68.27% of the data resulting in a multidimensional model gait. The light grey meshes represent stance phase and dark grey represents swing. The upper portion 1002 of FIG. 10 shows that the stride lengths, base of support, and symmetry are remarkably similar to sham mice. The 4 mm impact is centered over the sensory cortex of the mice, and leads to the formation of a visible lesion with widespread tissue loss. These mice have previously been shown to be unimpaired in spontaneous exploration of a novel arena, but display fine motor coordination deficits on a beamwalk test. Using the transformation, no noticeable differences were observed between the sham mice and TBI mice. Injured mice maintain right/left symmetry, consistent stepping, and solid intra and inter limb coordination.

Figure 11:
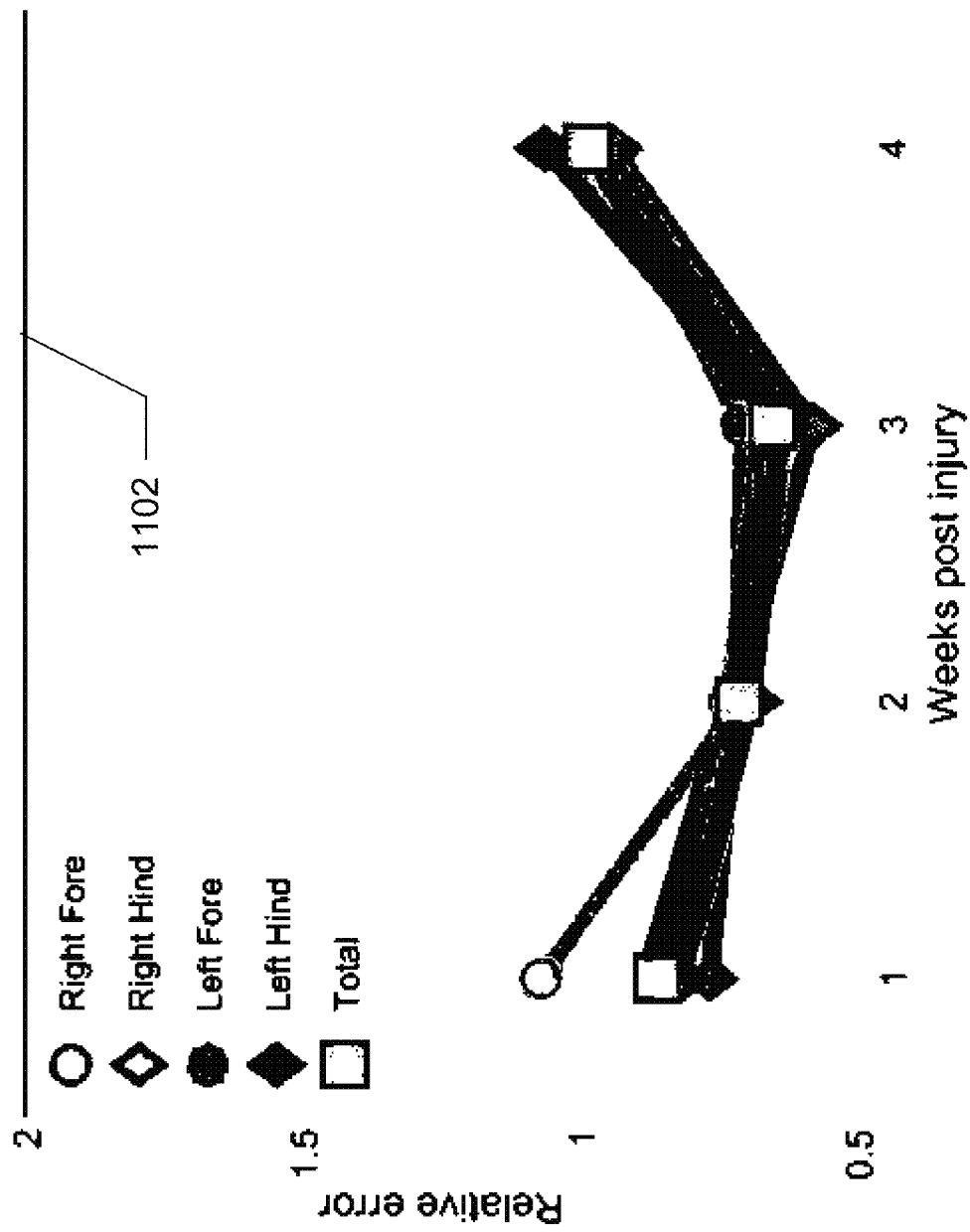
FIG. 11 is an exemplary illustration of spontaneous recovery of animal test subjects.

The lower portion 1002 of FIG. 10 introduces the third dimension of time (right hindlimb cycle time with initial contact at time 0) and shows the lack of change in intra and interlimb coordination can be observed. Following the CCI and sham mice for 4 weeks post-injury allows determination of how TBI alters multidimensional locomotion over time. Relative to the sham mice, it was found that there was no difference in gait following CCI. One week post-injury the multidimensional locomotion of TBI mice is not different from sham-injured mice (RE 0.86). This lack of change is maintained over the next 3 weeks as the CCI mice continue to display similar locomotor ability as the sham mice, as shown in FIG. 11. FIG. 11 shows no change in mouse gait after TBI. For up to four weeks after a CCI injury there is no significant difference in multidimensional gait measures between injured (N=13) and sham (N=12) animals. This is true of both total composite gait as well as individual limbs. Line 1102 at RE 2.0 represents the cutoff for significant difference. When whole body error measure is separated into the component limbs we see that the limbs behave similarly at all timepoints, and there is no difference between injury groups. At no point does the relative error of any limb or whole-body measure exceed 1.10 (significance occurs at values greater than 2).

Traditional measures such as stride length ($\Delta x$) and base of support ($\Delta y$) may be similar, but if they occur at different times in the reference limb step cycle ($\Delta t$), is it really a similar step? If only limb spatial measures are reported and not interlimb temporal measures one may falsely conclude that the steps are similar. Embodiments of the present techniques may be applied to assess the locomotor recover of rats after a C4/5 right over-hemisection injury. This revealed significant changes after injury, but embodiments of the present techniques may provide the capability to track the restoration of function and the development of compensatory techniques while minimizing the confound of measuring multiple dependent variables.

If the right forelimb is the most severely impaired limb, it has the greatest difference from pre-injury levels after injury. The peak difference is two weeks after injury instead of one, but this is most likely due to the high variability after injury. As the stepping becomes more consistent two weeks after injury, the relative error increases. However, as the weeks go on, the right forelimb does get more like pre-injury. On the other hand, for the first 4 weeks post injury the left forelimb is moderately different from pre-injury before dramatically increasing its difference for the last 3 weeks of the study. This not a delayed response to injury, but the development of a compensatory technique. The less impaired limbs, with their greater control and range of motion, take more abnormal steps to enable the more impaired limbs to take a more normal step. This is a trade-off between all the limbs that takes weeks to unfold. This trade-off is not readily apparent with traditional gait analysis techniques, but much clearer with our multidimensional analysis.

The left hindlimb is the most different from pre-injury 3 weeks after injury. This could be interpreted as either a delayed response to injury, or a compensatory technique that develops only to resolve as the left forelimb compensatory technique emerges. The right hindlimb is the reference limb, so phase differences will not be present, only space and time differences. Thus, it is not surprising that the right hindlimb exhibits the least amount of differences. There are still significant differences in space and time, but no apparent compensatory techniques develop. The CCI mouse model of TBI is extensively used to model contusion injury, and the behavioral and motor consequences of this type of injury are well documented by many groups, including ours. Injury severity in this model has a linear relationship in both cognitive and motor domains, but not in affective disorder domains. A 2 mm impact depth was used, which was previously shown to have a strong impact on learning and memory, and on striatum-mediated torso-flexion in the mice.

CCI mice also have acute impairments in other motor-mediated tasks such as the rotarod test, and chronic impairments in tests of fine motor coordination such as the beamwalk and gridwalk tests—however tests of locomotor ability and exploration in novel chambers show that the mice are not impaired in their ability to walk as their locomotion distance in a novel arena remains similar to sham mice.

In conclusion, rodent locomotion is a multidimensional behavior that requires multidimensional measures to accurately assess the differences between groups. Because of the interdependence of limb motion, and the limitations of the coordinate frame traditional techniques may report different gait measures for a slow animal that wanders compared to a fast animal that walks straight—even if they are the same animal. Embodiments of the present systems and methods may provide the capability to simplify these multiple measures into a single variable that embraces the nuanced coordinated interplay between multiple moving limbs. By plotting all steps in x,y,t space, is may be shows that rats develop compensatory techniques to overcome the locomotor deficits following a spinal cord injury and that mice do not exhibit locomotor changes in the model of TBI.

Figure 12:
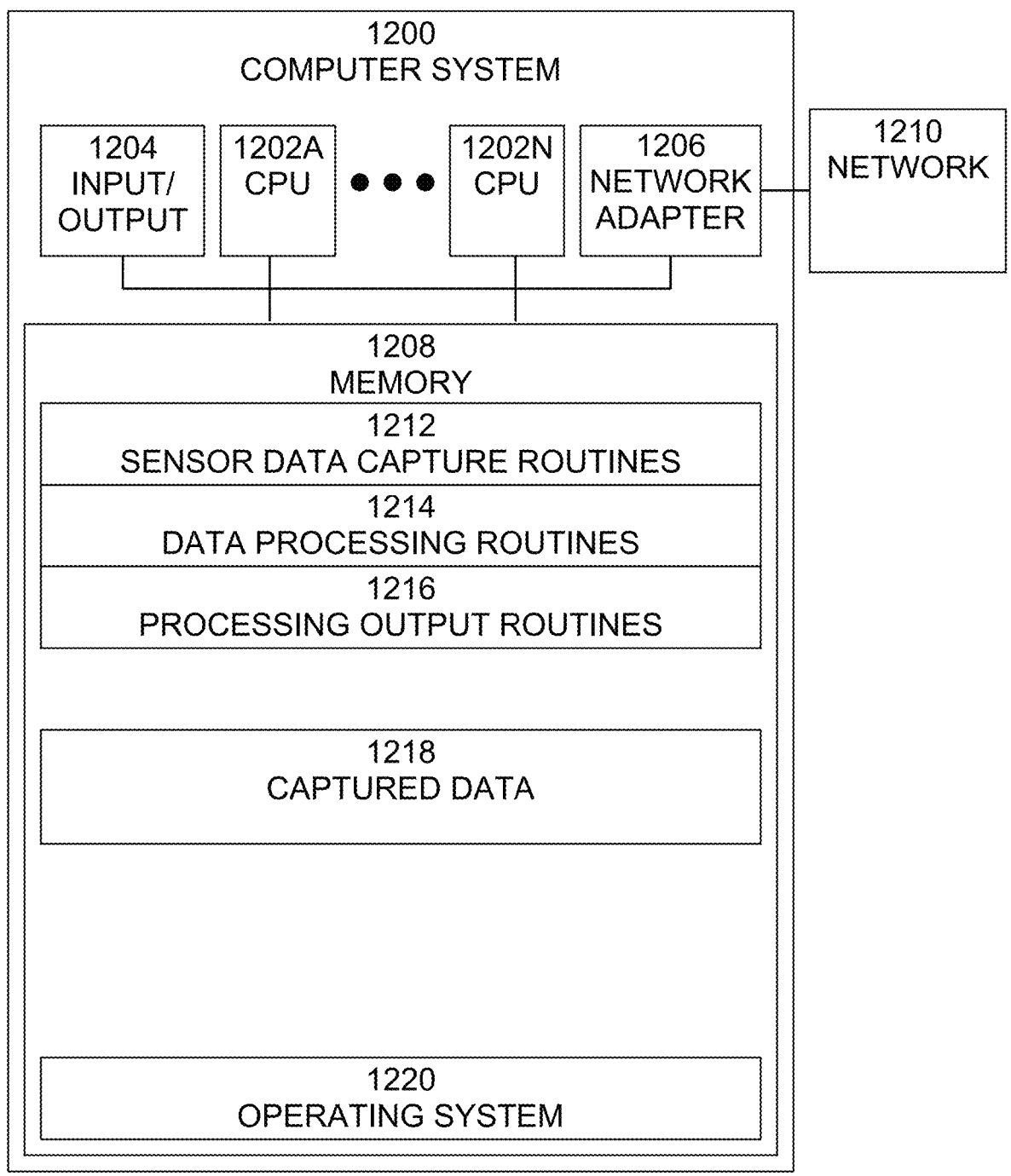
FIG. 12 is an exemplary illustration of a computer system in which embodiments of the present systems and methods may be implemented.

An exemplary block diagram of a computer system 1200, in which processes involved in the embodiments described herein may be implemented, is shown in FIG. 12. Computer system 1200 may be implemented using one or more programmed general-purpose computer systems, such as embedded processors, systems on a chip, personal computers, workstations, server systems, and minicomputers or mainframe computers, or in distributed, networked computing environments. Computer system 1200 may include one or more processors (CPUs) 1202A-1202N, input/output circuitry 1204, network adapter 1206, and memory 1208. CPUs 1202A-1202N execute program instructions in order to carry out the functions of the present communications systems and methods. Typically, CPUs 1202A-1202N are one or more microprocessors, such as an INTEL CORE® processor. FIG. 12 illustrates an embodiment in which computer system 1200 is implemented as a single multi-processor computer system, in which multiple processors 1202A-1202N share system resources, such as memory 1208, input/output circuitry 1204, and network adapter 1206. However, the present communications systems and methods also include embodiments in which computer system 1200 is implemented as a plurality of networked computer systems, which may be single-processor computer systems, multi-processor computer systems, or a mix thereof.

Input/output circuitry 1204 provides the capability to input data to, or output data from, computer system 1200. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 1206 interfaces device 1200 with a network 1210. Network 1210 may be any public or proprietary LAN or WAN, including, but not limited to the Internet.

Memory 1208 stores program instructions that are executed by, and data that are used and processed by, CPU 1202 to perform the functions of computer system 1200. Memory 1208 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 1208 may vary depending upon the function that computer system 1200 is programmed to perform. In the example shown in FIG. 12, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present communications systems and methods may include any and all such arrangements.

In the example shown in FIG. 12, memory 1208 may include sensor data capture routines 1212, data processing routines 1214, processing output routines 1216, captured data 1218, and operating system 1220. Sensor data capture routines 1212 may include software routines to obtain animal gait data, for example, from animal gait capture device 102, and to store such data as captured data 1218. Data processing routines 1214 may include software routines to process captured data 1218 in accordance with embodiments such as is shown in FIG. 2. Processing output routines 1216 may include software routines to output the resulting processed data from data processing routines 1214. Operating system 1220 may provide overall system functionality.

As shown in FIG. 12, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method of animal gait analysis, the method comprising:

measuring a two dimensional displacement of animal footfalls as a function of time at a frequency during normal gait of each of a plurality of animal test subjects, wherein the two dimensional displacement comprises a first horizontal component (x), a second horizontal component (y), and a time component (t) of all limbs of each of the plurality of animal test subjects;

translating the data associated with the two dimensional displacement from a world coordinate frame to a body coordinate frame, for each of the plurality of animal test subjects;

referencing the data for all limbs of each of the plurality of animal test subjects to be relative to a single reference limb of each of the plurality of animal test subjects;

defining a percentage of the data to be modelled;

selecting a sub-set of strides for each of the plurality of animal test subjects, wherein the sub-set of strides for each of the plurality of animal test subjects represent most similar strides of that animal test subject;

clustering the data based on a density of components x, y, t of that animal test subject;

modelling the clustered data by a mesh to define a volume boundary, wherein the defined percentage of the data are located within the volume and wherein the inside of the volume has a greater density of data than outside the volume;

defining a sum of residual distances as the sum of the distances from each of the modeled clustered data outside the volume to the boundary;

calculating a metric describing the gait of a selected animal test subject of the plurality of animal test subjects; and outputting the metric to a user.

2. The method of claim 1, wherein the data is captured using an animal gait capture device.

3. The method of claim 1, wherein the metric describing the gait of a selected animal comprises the product of:
- the sum of residual distances;
- the x,y,t volume bounded by the mesh; and
- the ratio of the number of points outside of the volume to the number of points inside the volume.

4. The method of claim 3, wherein the defined percentage of data points within the volume is 68.27%.

5. A system for animal gait analysis, the system comprising a processor, memory accessible by the processor, and computer program instructions stored in the memory and executable by the processor to perform:
- measuring a two dimensional displacement of animal footfalls as a function of time at a frequency during normal gait of each of a plurality of animal test subjects, wherein the two dimensional displacement comprises a first horizontal component (x), a second horizontal component (y), and a time component (t) of all limbs of each of the plurality of animal test subjects;
- translating the data associated with the two dimensional displacement from a world coordinate frame to a body coordinate frame, for each of the plurality of animal test subjects;
- referencing the data for all limbs of each of the plurality of animal test subjects to be relative to a single reference limb of each of the plurality of animal test subjects;
- defining a percentage of the data to be modelled;
- selecting a sub-set of strides for each of the plurality of animal test subjects, wherein the sub-set of strides for each of the plurality of animal test subjects represent most similar strides of that animal test subject;
- clustering the data based on a density of components x, y, t of that animal test subject;
- modelling the clustered data by a mesh to define a volume boundary, wherein the defined percentage of the data are located within the volume and wherein the inside of the volume has a greater density of data than outside the volume;
- defining a sum of residual distances as the sum of the distances from each of the modeled clustered data outside the volume to the boundary;
- calculating a metric describing the gait of a selected animal test subject of the plurality of animal test subjects; and
- outputting the metric to a user.

6. The system of claim 5, wherein the data is captured using an animal gait capture device.

7. The method of claim 5, wherein the metric describing the gait of a selected animal comprises the product of:
- the sum of residual distances;
- the x,y,t volume bounded by the mesh; and
- the ratio of the number of points outside of the volume to the number of points inside the volume.

8. The method of claim 7, wherein the defined percentage of data points within the volume is 68.27%.

9. A computer program product for animal gait analysis, the computer program product comprising a non-transitory computer readable storage having program instructions embodied therewith, the program instructions executable by a computer, to cause the computer to perform a method comprising:
- measuring a two dimensional displacement of the animal footfalls as a function of time at a frequency during normal gait of each of a plurality of animal test subjects, wherein the two dimensional displacement comprises a first horizontal component (x), a second horizontal component (y), and a time component (t) of all limbs of each of the plurality of animal test subjects;
- translating the data associated with the two dimensional displacement from a world coordinate frame to a body coordinate frame, for each of the plurality of animal test subjects;
- referencing the data for all limbs of each of the plurality of animal test subjects to be relative to a single reference limb of each of the plurality of animal test subjects;
- defining a percentage of the data to be modelled;
- selecting a sub-set of strides for each of the plurality of animal test subjects, wherein the sub-set of strides for each of the plurality of animal test subjects represent most similar strides of that animal test subject;
- clustering the data based on a density of components x, y, t of that animal test subject;
- modelling the clustered data by a mesh to define a volume boundary, wherein the defined percentage of the data are located within the volume and wherein the inside of the volume has a greater density of data than outside the volume;
- defining a sum of residual distances as the sum of the distances from each of the modeled clustered data outside the volume to the boundary;
- calculating a metric describing the gait of a selected animal test subject of the plurality of animal test subjects; and
- outputting the metric to a user.

10. The computer program product of claim 9, wherein the data is captured using an animal gait capture device.

11. The computer program product of claim 9, wherein the metric describing the gait of a selected animal comprises the product of:
- the sum of residual distances;
- the x,y,t volume bounded by the mesh; and
- the ratio of the number of points outside of the volume to the number of points inside the volume.

12. The computer program product of claim 11, wherein the defined percentage of data points within the volume is 68.27%.

* * * * *